United States Patent
Frosch et al.

(10) Patent No.: US 10,308,087 B1
(45) Date of Patent: Jun. 4, 2019

(54) UNIVERSAL EQUIPMENT TRAILER

(71) Applicant: DRM Industries Corp., Lake Delton, WI (US)

(72) Inventors: Gregory J. Frosch, Sauk City, WI (US); Nathan A. Pickhard, Sauk City, WI (US)

(73) Assignee: DRM INDUSTRIES CORP., Lake Delton, WI (US)

( * ) Notice: Subject to any disclaimer, the term of this patent is extended or adjusted under 35 U.S.C. 154(b) by 142 days.

(21) Appl. No.: 15/446,593

(22) Filed: Mar. 1, 2017

Related U.S. Application Data

(60) Provisional application No. 62/302,399, filed on Mar. 2, 2016.

(51) Int. Cl.
| | | |
|---|---|---|
| *B60D 1/50* | (2006.01) | |
| *B62D 53/08* | (2006.01) | |
| *B60D 1/04* | (2006.01) | |
| *B62D 53/06* | (2006.01) | |

(52) U.S. Cl.
CPC ................. *B60D 1/50* (2013.01); *B60D 1/04* (2013.01); *B62D 53/061* (2013.01); *B62D 53/067* (2013.01); *B62D 53/0842* (2013.01)

(58) Field of Classification Search
CPC ...... B60D 1/50; B62D 53/061; B62D 53/067; B62D 53/065; B62D 53/062; B61D 3/184
See application file for complete search history.

(56) References Cited

U.S. PATENT DOCUMENTS

| | | | | | |
|---|---|---|---|---|---|
| 2,449,947 | A | * | 9/1948 | Meadows | B60P 3/07 280/425.2 |
| 2,515,379 | A | * | 7/1950 | Paine | B60G 17/021 280/414.5 |
| 2,858,950 | A | * | 11/1958 | Martin | B62D 53/065 280/425.2 |
| 3,071,267 | A | * | 1/1963 | Bunch | B60G 5/01 280/400 |
| 3,217,911 | A | * | 11/1965 | McMullen | B60P 1/025 108/57.15 |
| 3,655,214 | A | * | 4/1972 | Lane | B60P 1/6427 280/43.23 |
| 3,901,535 | A | * | 8/1975 | Gee | B62D 53/062 280/423.1 |
| 3,918,744 | A | | 11/1975 | Gay | |
| 3,945,668 | A | * | 3/1976 | Holland | B62D 53/0828 280/423.1 |
| 4,197,048 | A | * | 4/1980 | Brill | B62D 53/062 414/480 |
| 4,433,853 | A | | 2/1984 | Swaim | |

(Continued)

*Primary Examiner* — Nicole T Verley

(74) *Attorney, Agent, or Firm* — Charles S. Sara; DeWitt LLP

(57) ABSTRACT

A universal equipment trailer allows the trailer to connect to a variety of towing vehicles, whether the towing vehicle uses a standard trailer hitch or kingpin hitch. A hydraulic or pneumatic system on the trailer can raise or lower a coupling assembly to place one of two available connectors in position for linking to the vehicle hitch. Because the coupling assembly locks into position once raised or lowered, the connection between the towing vehicle and the trailer is secure. The parts for the universal equipment trailer may also be supplied as a kit, allowing conversion of standard trailers to universal equipment trailers.

22 Claims, 14 Drawing Sheets

(56) References Cited

U.S. PATENT DOCUMENTS

| | | | |
|---|---|---|---|
| 4,817,537 A | 4/1989 | Cripe et al. | |
| 4,917,020 A * | 4/1990 | Wicks | B60F 1/046 |
| | | | 105/215.2 |
| 5,069,507 A * | 12/1991 | Lindsey | B60P 1/34 |
| | | | 298/11 |
| 5,566,964 A | 10/1996 | Leonard | |
| 5,758,890 A * | 6/1998 | Wessels | B62D 53/067 |
| | | | 280/149.2 |
| 5,797,614 A | 8/1998 | Hord et al. | |
| 5,988,664 A * | 11/1999 | Hill | B62D 53/0828 |
| | | | 280/402 |
| 6,036,207 A | 3/2000 | Oehlerking et al. | |
| 6,425,627 B1 * | 7/2002 | Gee | B62D 53/062 |
| | | | 280/789 |
| 7,261,177 B2 * | 8/2007 | Eckelberry | B62D 53/068 |
| | | | 180/209 |
| 7,857,343 B2 * | 12/2010 | Gipson | B62D 53/062 |
| | | | 280/441.2 |
| 7,878,524 B1 | 2/2011 | Hemmingsen | |
| 7,950,675 B1 * | 5/2011 | Quenzi | B60G 17/02 |
| | | | 180/209 |
| 8,151,426 B2 | 4/2012 | Schneider | |
| 8,210,557 B2 * | 7/2012 | Schneider | B60D 1/07 |
| | | | 280/416.1 |
| 8,286,997 B2 * | 10/2012 | Kimener | B60D 1/665 |
| | | | 280/763.1 |
| 8,317,215 B2 * | 11/2012 | Quenzi | B60P 3/06 |
| | | | 280/425.1 |
| 8,398,109 B2 * | 3/2013 | Amrine, Jr. | B62D 53/061 |
| | | | 280/418.1 |
| 8,419,037 B2 * | 4/2013 | Graber | B60P 3/32 |
| | | | 280/433 |
| 8,926,252 B2 * | 1/2015 | McIver | B60P 1/6427 |
| | | | 414/332 |
| 9,126,644 B2 * | 9/2015 | Banwart | B62D 53/0842 |
| 2005/0067799 A1 * | 3/2005 | Smith | B60P 1/027 |
| | | | 280/6.151 |
| 2007/0228686 A1 * | 10/2007 | Gerstenslager | B62D 53/068 |
| | | | 280/149.2 |
| 2007/0290495 A1 * | 12/2007 | Biscan | B62D 21/20 |
| | | | 280/789 |
| 2014/0339792 A1 | 11/2014 | Schuettenberg | |
| 2015/0375663 A1 * | 12/2015 | Robertson | B60P 1/18 |
| | | | 414/475 |

* cited by examiner

UNIVERSAL EQUIPMENT TRAILER

CROSS-REFERENCE TO RELATED APPLICATIONS

The present application claims priority of U.S. Provisional Patent Application No. 62/302,399, filed on Mar. 2, 2016, the contents of which are incorporated herein by reference in their entirety.

FIELD OF THE INVENTION

The present invention is directed to a vehicle trailer and particularly to a universal equipment trailer which can be attached to a towing vehicle either by using a standard pintle-ring hitch or by attaching a kingpin to a fifth-wheel hitch on a semi-truck.

BACKGROUND OF THE INVENTION

Trailers are well-known vehicle accessories used for transporting a variety of cargos. Trailers attach to a towing vehicle by means of a coupling assembly in the front of the trailer that attaches to a hitch assembly connected to the back of the towing vehicle. Trailers exert significant forces on the towing vehicle during transport. Due to the substantial danger of injury or of cargo or trailer damage if a trailer disconnects from the towing vehicle during transit, hitch assemblies are commonly mounted directly to the towing vehicle frame or built into the frame during manufacture.

Unfortunately, most trailers can only accommodate a very limited height differential before the coupling assembly becomes incapable of attaching to the hitch assembly. Most trailers are also incapable of attaching to different types of towing vehicles, as the fifth-wheel hitch assemblies for a semi-truck are very different from the pintle-ring hitch assemblies commonly found on agricultural, industrial, and military towing vehicles. As a result, cargo may need to be shifted from trailer to trailer to accommodate different towing vehicles, resulting in loss of time and increased manpower requirements. If additional trailers are not available, then the cargo cannot be moved at all. Furthermore, certain types of trailer may be manufactured with a coupling assembly for only one type of towing vehicle, making them unable to connect to other vehicles.

U.S. Pat. No. 3,918,744 to Gay discloses a vertically adjustable hitch assembly connecting a vehicle to a towing unit. The hitch assembly has a pair of parallel links pivotally connected to a towing connector and having an actuator for the braking system. However, Gay does not appear to disclose or suggest attachment via a fifth-wheel hitch assembly.

U.S. Pat. No. 4,433,853 to Swaim is directed to a convertible trailer hitch for towing a trailer, which includes a gooseneck arm for use as a hitch. The gooseneck arm is braced by an A-frame tongue and the hitch can be converted to a bumper type hitch by detaching the forward end of the tongue from the gooseneck arm, swinging the same down and attaching it to the rear of the towing vehicle. Swaim, too, does not appear to disclose or suggest attachment via a fifth-wheel hitch assembly, or attachment to any vehicle other than a pickup truck.

U.S. Pat. No. 8,398,109 to Amrine, Jr. and U.S. Pat. No. 8,210,557 to Schneider illustrate trailers which have three decks, including: $1^{st}$ deck which is the trailer bed for receiving goods to be hauled; $2^{nd}$ deck for attaching the trailer to the vehicle; and $3^{rd}$ articulated deck which can raise or lower the $2^{nd}$ deck depending on whether the attachment is via a trailer hitch or a kingpin. However, both Amrine and Schneider require raising and lowering multiple articulated decks, reducing the overall strength of the trailer.

BRIEF SUMMARY OF THE INVENTION

The present invention is a universal equipment trailer for connection to a towing vehicle. The trailer includes a first trailer deck rigidly connected to a first trailer riser and a second trailer riser. A coupling box frame is rotatably connected to the first trailer riser and the second trailer riser by a plurality of rotational pins. The coupling box frame is releasably connected to the first trailer riser and the second trailer riser by at least one of a plurality of locking pin pairs. At least one side of the coupling box frame is a pin cylinder rest. A plurality of locking pin cylinders are connected to the pin cylinder rest. Each locking pin cylinder interconnects one of the plurality of locking pin pairs. A rotational cylinder capable of raising and lowering the coupling box frame and a central coupling beam interconnects the coupling box frame and a lower surface of the first trailer deck. The central coupling beam extends between a pintle ring connector and a side of the coupling box frame opposite the pin cylinder rest. A kingpin connector extends from a bottom surface of the central coupling beam.

The present invention also encompasses a kit for converting a trailer into a universal equipment trailer. Such a kit includes the elements described above.

The objects and advantages of the invention will appear more fully from the following detailed description of the preferred embodiment of the invention made in conjunction with the accompanying drawings.

DETAILED DESCRIPTION OF THE INVENTION

Figure 1A:
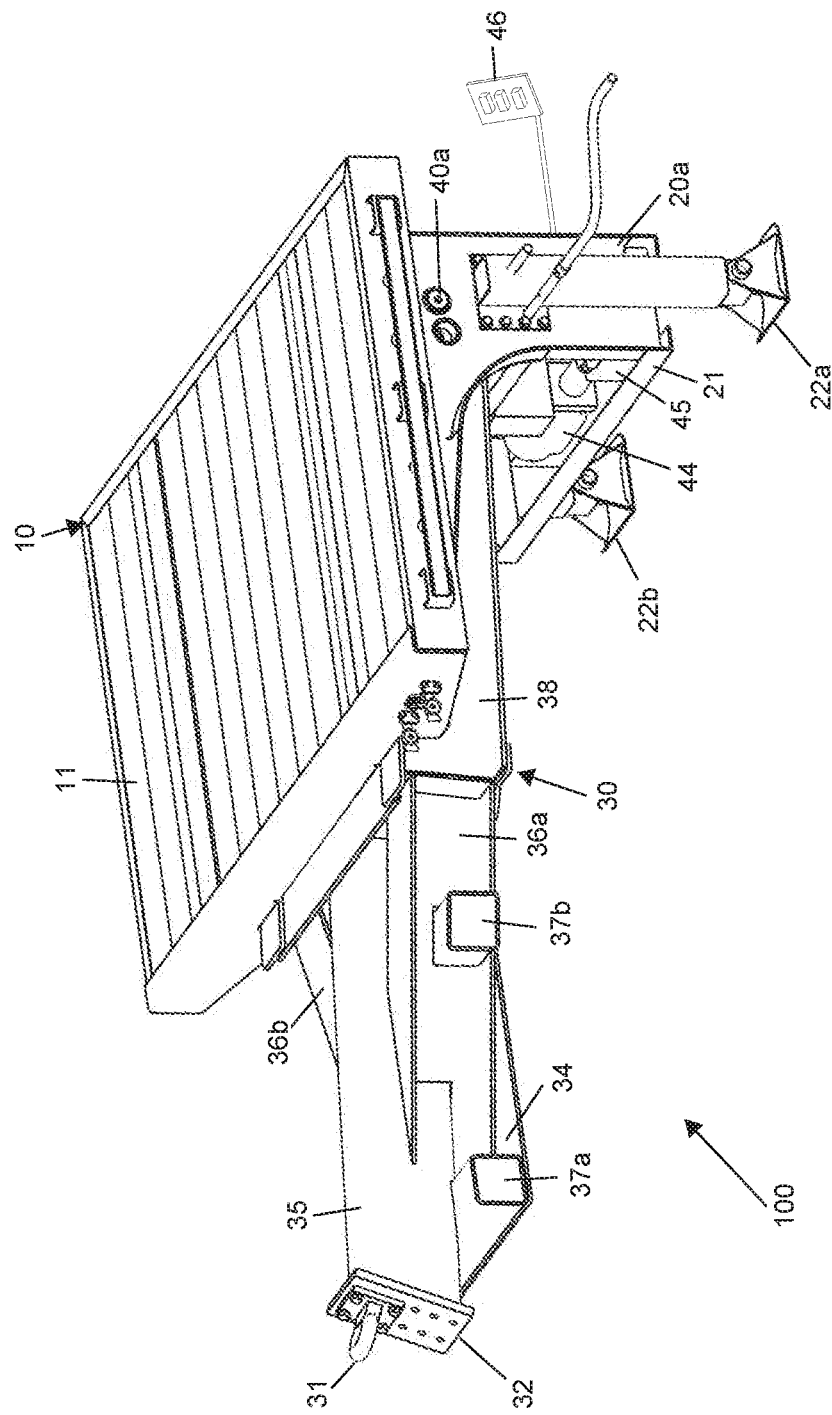
FIGS. 1a through 1c illustrate partial front top perspective, partial rear bottom perspective, and partial rear top perspective views, respectively, of an exemplary embodiment of a universal equipment trailer with a coupling assembly in a raised position.
Figure 1B:
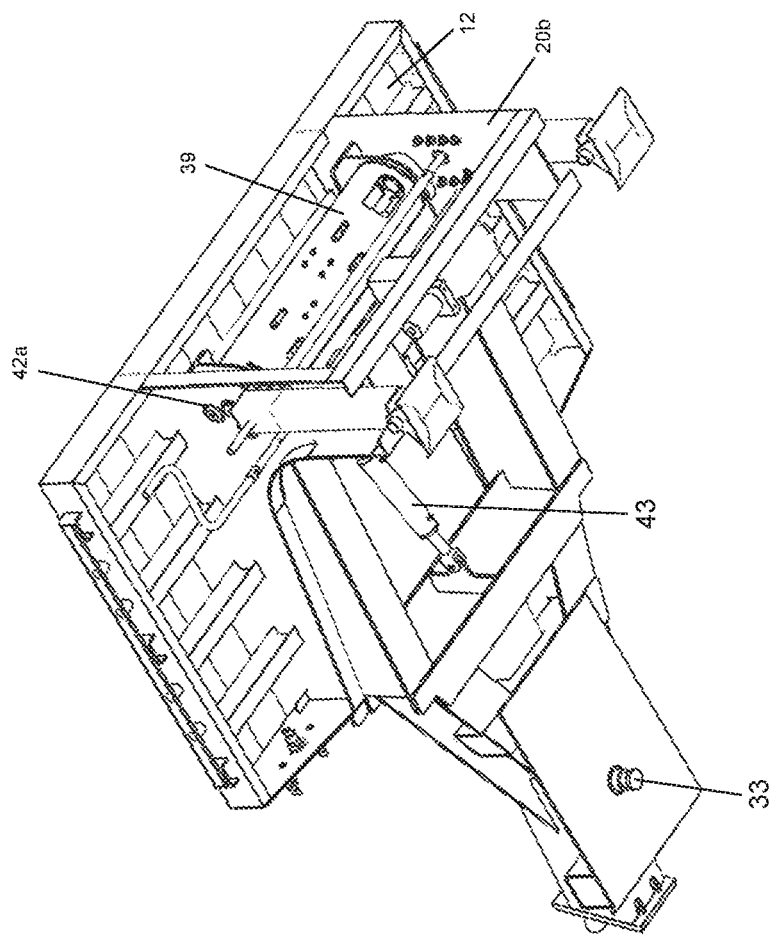
Figure 1C:
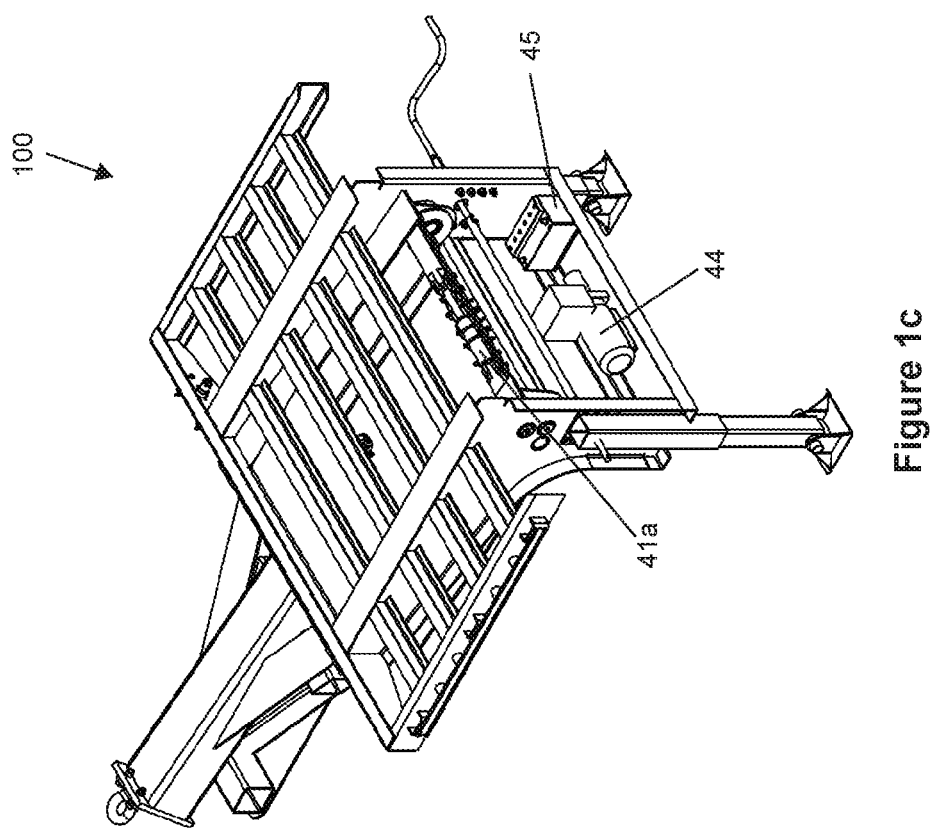

FIGS. 1a through 1c illustrate partial front top perspective, partial rear bottom perspective, and partial rear top perspective views, respectively, of an exemplary embodiment of universal equipment trailer 100 with a coupling assembly 30 in a raised position. In this position, coupling assembly 30 can couple to a towing vehicle with a fifth-wheel hitch assembly.

Figure 2A:
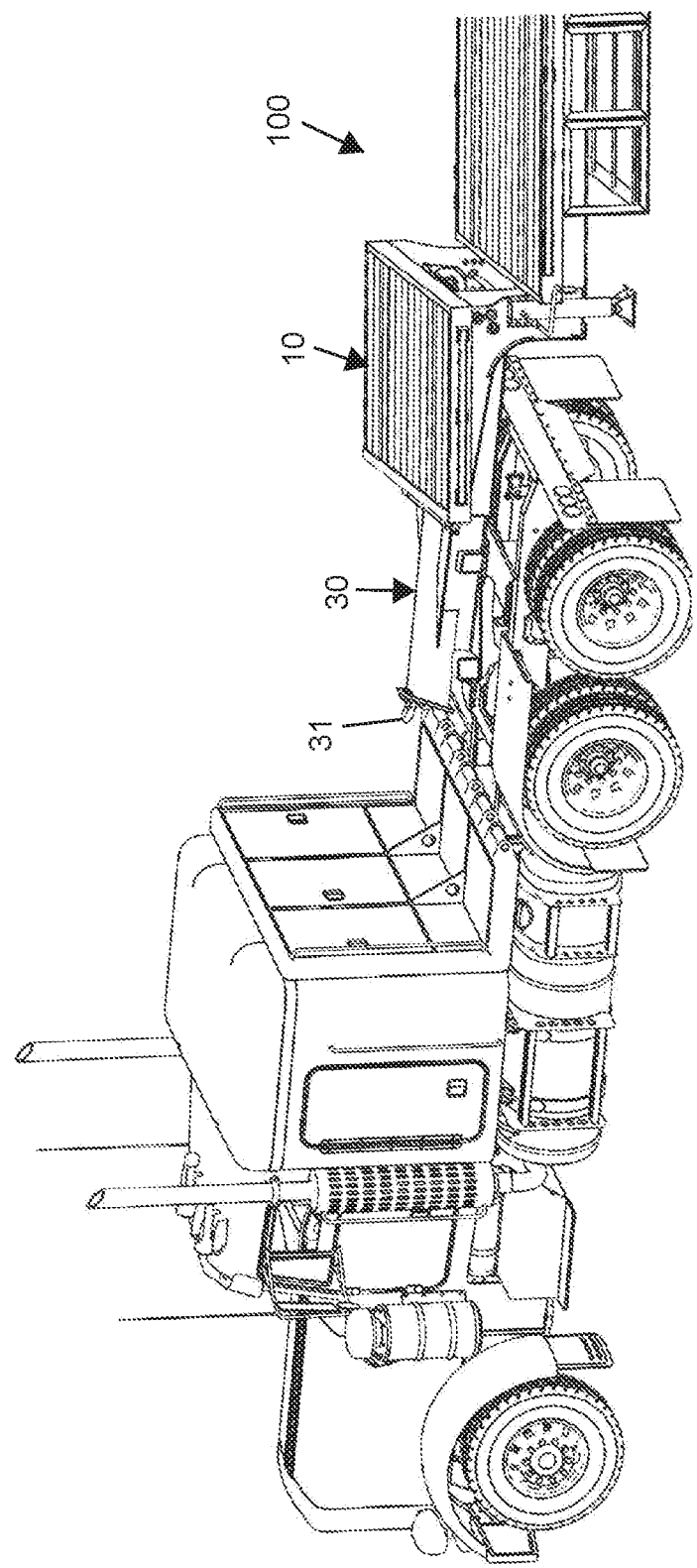
FIGS. 2a and 2b illustrate partial rear top perspective and partial side views, respectively, of an exemplary embodiment of a universal equipment trailer attached to a semi-truck.
Figure 2B:
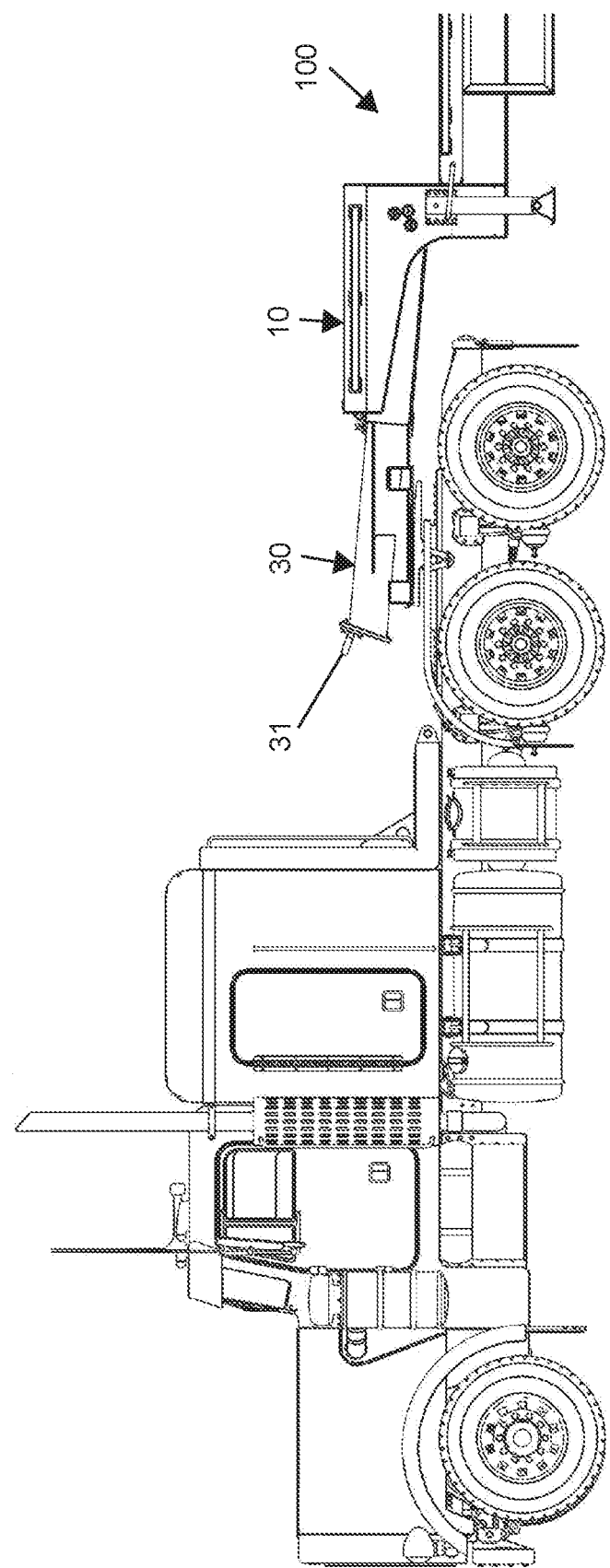
Figure 3A:
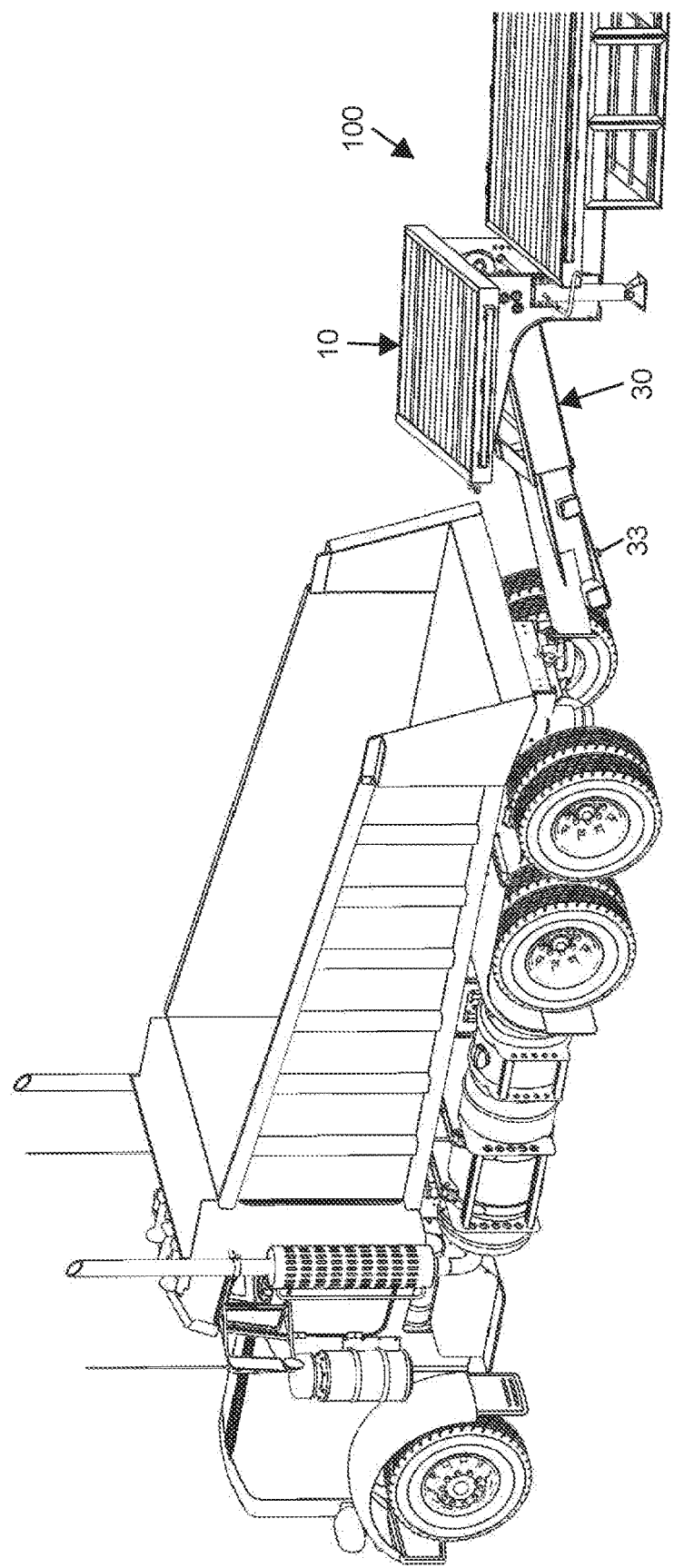
FIGS. 3a and 3b illustrate partial rear top perspective and partial side views, respectively, of an exemplary embodiment of the universal equipment trailer attached to a dump truck.
Figure 3B:
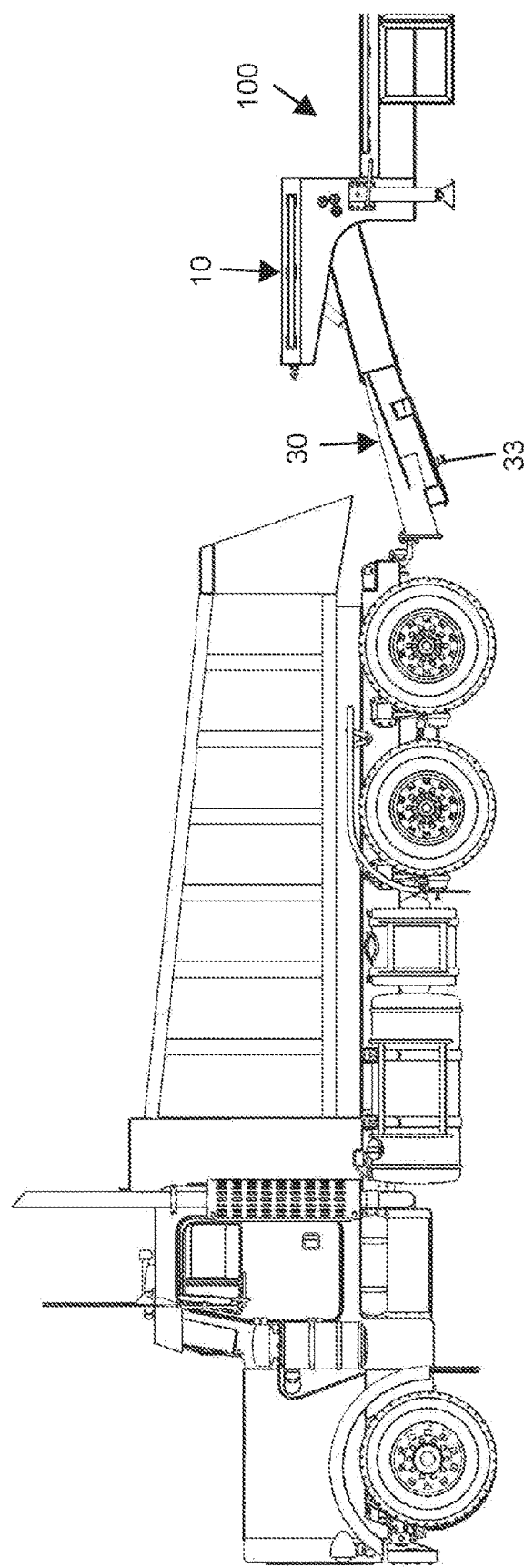

Coupling assembly 30 is rotatably connected to a first trailer deck 10 and trailer risers 20a and 20b. First trailer deck 10 is rigidly connected to trailer risers 20a and 20b. Trailer risers 20a and 20b are rigidly interconnected by at least first deck 10 and at least one riser connector 21. Adjustable landing gears 22a and 22b connected to trailer risers 20a and 20b can be lowered to support trailer 100 when trailer 100 is uncoupled from a towing vehicle. First trailer deck 10 has an upper surface 11 and a lower surface 12. Coupling assembly 30 is attached to trailer risers 20a and 20b and lower surface 12 of first trailer deck 10. Coupling assembly 30 may rotate to raise its proximal end and accommodate connection of trailer 100 to a semi-truck, as shown in FIGS. 2a and 2b, or rotate to lower its proximal end and accommodate connection to a different towing vehicle with a lower hitch assembly, such as a dump truck, as shown in FIGS. 3a and 3b.

Coupling assembly 30 includes two different connectors, a pintle ring connector 31 on the proximal end of coupling assembly 30, and a kingpin connector 33 on a proximal bottom side of coupling assembly 30. Pintle ring connector 31 attaches to a central coupling beam 35 through a ring mounting plate 32 on the proximal end of central coupling beam 35. Pintle ring connector 31 extends from central coupling beam 35 at such an angle that when central coupling beam 35 is in a fully lowered position, pintle ring connector 31 is parallel to a ground surface. Kingpin connector 33 attaches to central coupling beam 35 through a kingpin mounting plate 34 on a proximal bottom side of central coupling beam 35. Kingpin connector 33 and kingpin mounting plate 34 attach to central coupling beam 35 at such an angle that when central coupling beam 35 is in a fully raised position, kingpin connector 33 extends orthogonally to the ground surface and second deck 30, and kingpin mounting plate 34 is parallel to the ground surface and second deck 30.

Central coupling beam 35 has a hollow square cross section where almost all other segments of coupling assembly 30 have an I-shaped cross section. The distal end of central coupling beam 35 is mounted to an external proximal side of coupling box frame 38. Two side coupling beams 36a and 36b extend at an angle from the external proximal side of coupling box frame 38 to converge on the proximal end of central coupling beam 35. Side coupling beams 36a and 36b provide reinforcement to central coupling beam 35.

Cross coupling beams 37a and 37b extend orthogonally to central coupling beam 35. Aside from central coupling beam 35, cross coupling beams 37a and 37b are the only other segments of coupling assembly 30 to have a hollow square cross section.

Cross coupling beam 37a is located between the proximal ends of kingpin mounting plate 34 and central coupling beam 35. This configuration reinforces the proximal edge of kingpin mounting plate 34. This configuration also provides the required angulation between kingpin mounting plate 34 and central coupling beam 35 to ensure that when central coupling beam 35 is in a fully raised position, kingpin connector 33 extends orthogonally to the ground surface and kingpin mounting plate 34 is parallel to the ground surface.

Cross coupling beam 37b extends through central coupling beam 35 and side coupling beams 36a and 36b at a point approximately midway between the proximal and distal ends of central coupling beam 35. This configuration reinforces the distal edge of kingpin mounting plate 34. This configuration also provides additional reinforcement and stability between central coupling beam 35 and side coupling beams 36a and 36b.

Figure 1D:
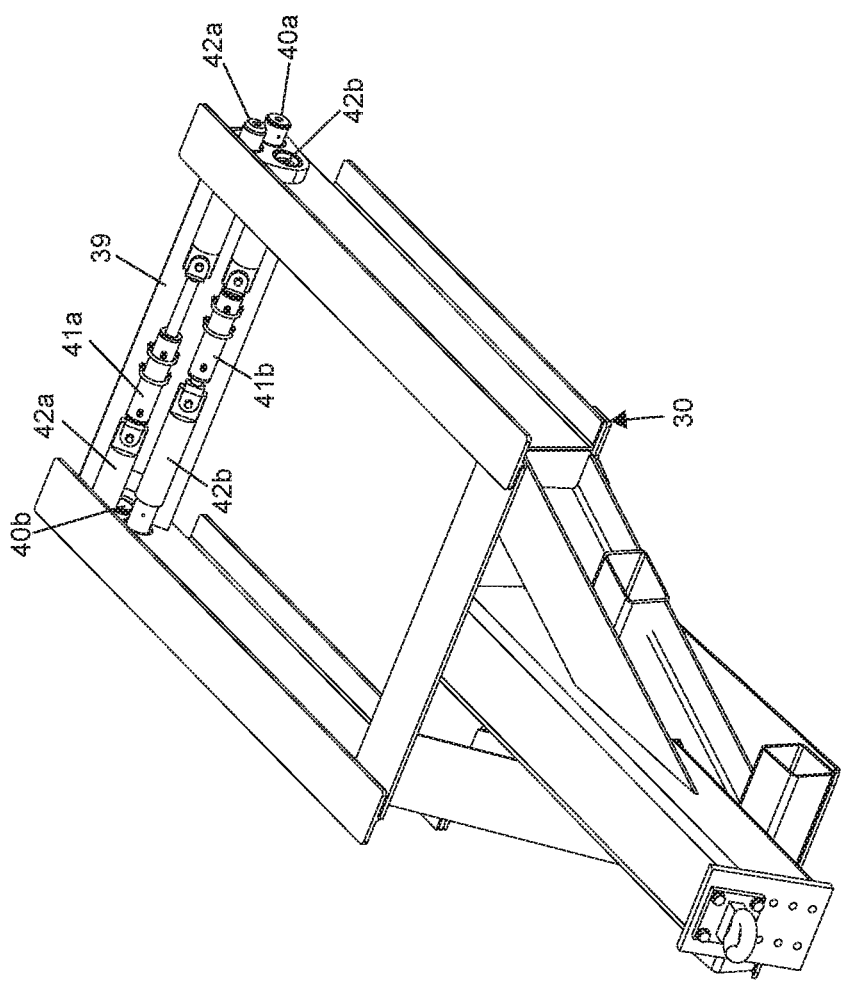
FIG. 1d illustrates a front top perspective view of an exemplary embodiment of a coupling box frame.

FIG. 1d illustrates a front top perspective view of an exemplary embodiment of a coupling box frame 38. In the exemplary embodiment, coupling box frame 38 is an open, four-sided frame. One side of the frame is a distal pin cylinder rest 39 rotatably attached to trailer risers 20a and 20b. Opposite distal pin cylinder rest 39 is an external proximal side attached to central coupling beam 35 and side coupling beams 36a and 36b. In certain other embodiments, coupling box frame 38 may have a three-sided configuration. Coupling box frame 38 is attached to trailer risers 20a and 20b through two rotational pins 40a and 40b extending laterally from pin cylinder rest 39 and through trailer risers 20a and 20b, respectively.

Locking pin cylinders 41a and 41b are attached to pin cylinder rest 39. As used herein, the term "cylinder" refers to a mechanical actuator capable of linear expansion and/or contraction. Locking pin cylinders 41a and 41b are each coupled between upper and lower locking pin pairs, 42a and 42b, respectively. Locking pin cylinders 41a and 41b can be actuated to extend or retract locking pin pairs 42a and 42b through coupling box frame 38 and trailer risers 20a and 20b. When locking pin set 42a is expanded and locking pin set 42b is retracted, coupling assembly is locked in a raised position. When locking pin set 42b is expanded and locking pin set 42a is retracted, coupling assembly is locked in a lowered position. When both locking pin set 42a and locking pin set 42b are retracted, coupling assembly 30 can move between raised and lowered positions.

An internal proximal side of coupling box frame 38 is attached to a proximal end of rotational cylinder 43. The distal end of rotational cylinder 43 is attached to lower surface 12. A fluid base unit 44 is connected to and provides actuating force for both locking pin cylinders 41a and 41b and for rotational cylinder 43. Fluid base unit 44 includes a fluid pump and may provide pneumatic or hydraulic force by pumping a fluid to locking pin cylinders 41a and 41b and rotational cylinder 43. Both locking pin cylinders 41a and 41b and rotational cylinder 43 are double-acting cylinders, allowing fluid base unit 44 to extend and retract the cylinders. In certain embodiments, the fluid pump may be a manual pump or a powered pump. In embodiments using pneumatic force, fluid base unit 44 may be connected to a towing vehicle's air system. In embodiments using hydraulic force, fluid base unit 44 also includes a hydraulic reservoir. In certain embodiments, fluid base unit 44 is connected to and provides actuating force for both adjustable landing gears 22a and 22b.

A power source 45 provides power to fluid base unit 44. In the exemplary embodiment, power source 45 is a 12-volt battery. In certain other embodiments, power source 45 is a battery with a different voltage, multiple batteries, or the towing vehicle's power system. In embodiments using a battery or batteries, power source 45 may be connected to towing vehicle's power system for charging. In the exemplary embodiment, both fluid base unit 44 and power source 45 are located on riser connector 21.

A control unit 46 is operably connected to locking pin cylinders 41a and 41b and rotational cylinder 43. In the exemplary embodiment, control unit 46 is a three-spool lever, with each spool controlling one of locking pin cylinders 41a and 41b and rotational cylinder 43. In other embodiments, control unit 46 may be an electrical, pneumatic, or hydraulic unit, or any other type of control unit known in the art. Control unit 46 may be preprogrammed to sequentially actuate one of locking pin cylinders 41a or 41b, rotational cylinder 43, and the other of locking pin cylinders 41a or 41b. Which of locking pin cylinders 41a or 41b is actuated first may be selected by the user or based on the current position of coupling assembly 30.

In use, retraction of locking pin set 42b allows coupling box frame 38 to move upwards. Contraction of rotational cylinder 43 rotates coupling box frame 38 about rotational pins 40a and 40b, raising pintle ring connector 31 and kingpin connector 33. Expansion of locking pin set 42a then locks coupling assembly 30 in a raised position.

Figure 1E:
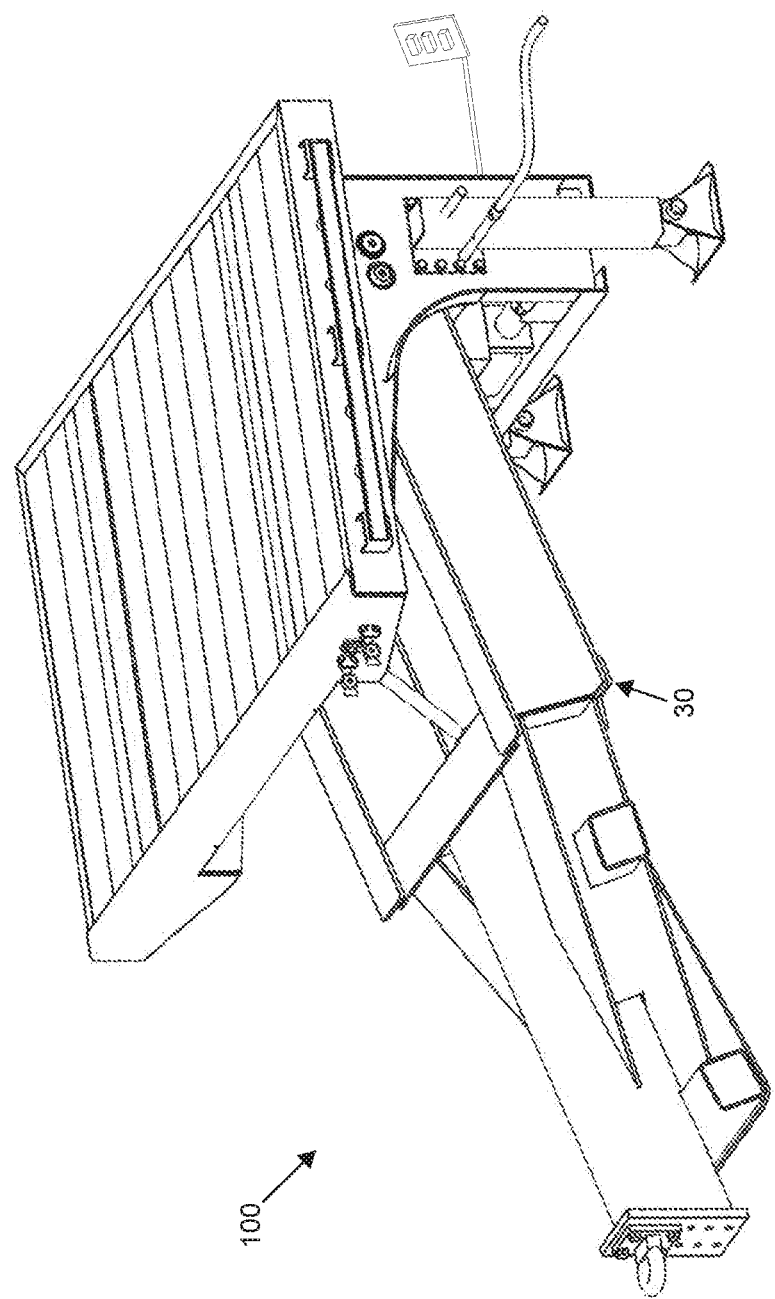
FIGS. 1e and 1f illustrate partial front top perspective and partial rear bottom perspective views, respectively, of an exemplary embodiment of the universal equipment trailer with the coupling assembly in a lowered position.
Figure 1F:
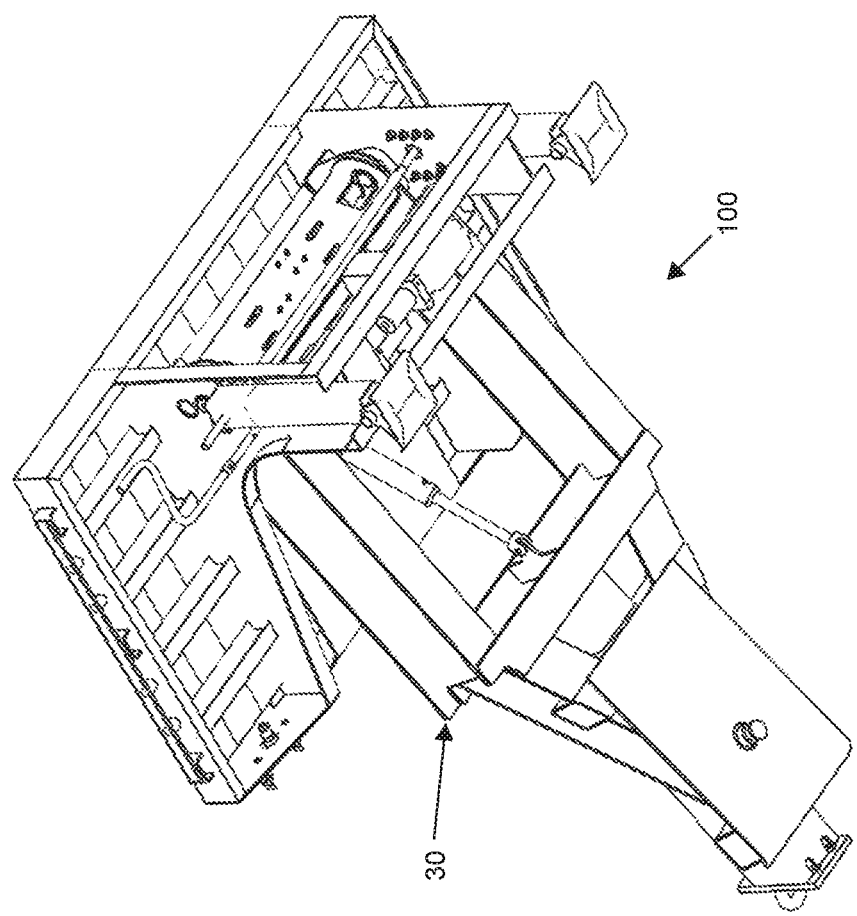

FIGS. 1e and 1f illustrate partial front top perspective and partial rear bottom perspective, respectively, of an exemplary embodiment of universal equipment trailer 100 with coupling assembly 30 in a lowered position. In this position, coupling assembly 30 can couple to a towing vehicle with a pintle-ring hitch assembly.

In use, retraction of locking pin set 42a allows coupling box frame 38 to move downwards. Expansion of rotational cylinder 43 rotates coupling box frame 38 about rotational pins 40a and 40b, lowering pintle ring connector 31 and kingpin connector 33. Expansion of locking pin set 42b then locks coupling assembly 30 in a lowered position.

FIGS. 2a and 2b illustrate partial rear top perspective and partial side views, respectively, of an exemplary embodiment of universal equipment trailer 100 attached to a semi-truck. In the embodiment shown, universal equipment trailer 100 includes at least a first trailer deck 10 rigidly connected by trailer risers 20a and 20b to an optional second trailer deck 60 so that second trailer deck 60 is located parallel to and at some height below first trailer deck 10. First trailer deck 10, trailer risers 20a and 20b, and second trailer deck 60 are immobile relative to each other. As used herein, the term "deck" refers to an element having upper and lower surfaces which may be solid, apertured, pierced, mesh, latticed, barred, flat, angled, or ridged. FIGS. 2a and 2b also show a coupling assembly 30 raised to couple to a fifth-wheel hitch assembly. As can be seen in FIG. 2b, pintle ring connector 31 is not positioned to connect to the towing vehicle.

FIGS. 3a and 3b illustrate partial rear top perspective and partial side views, respectively, of an exemplary embodiment of universal equipment trailer 100 attached to a dump truck. FIGS. 3a and 3b show coupling assembly 30 lowered to couple to a pintle-ring hitch assembly. As can be seen in FIG. 3b, kingpin connector 33 is not positioned to connect to the towing vehicle.

Figure 4:
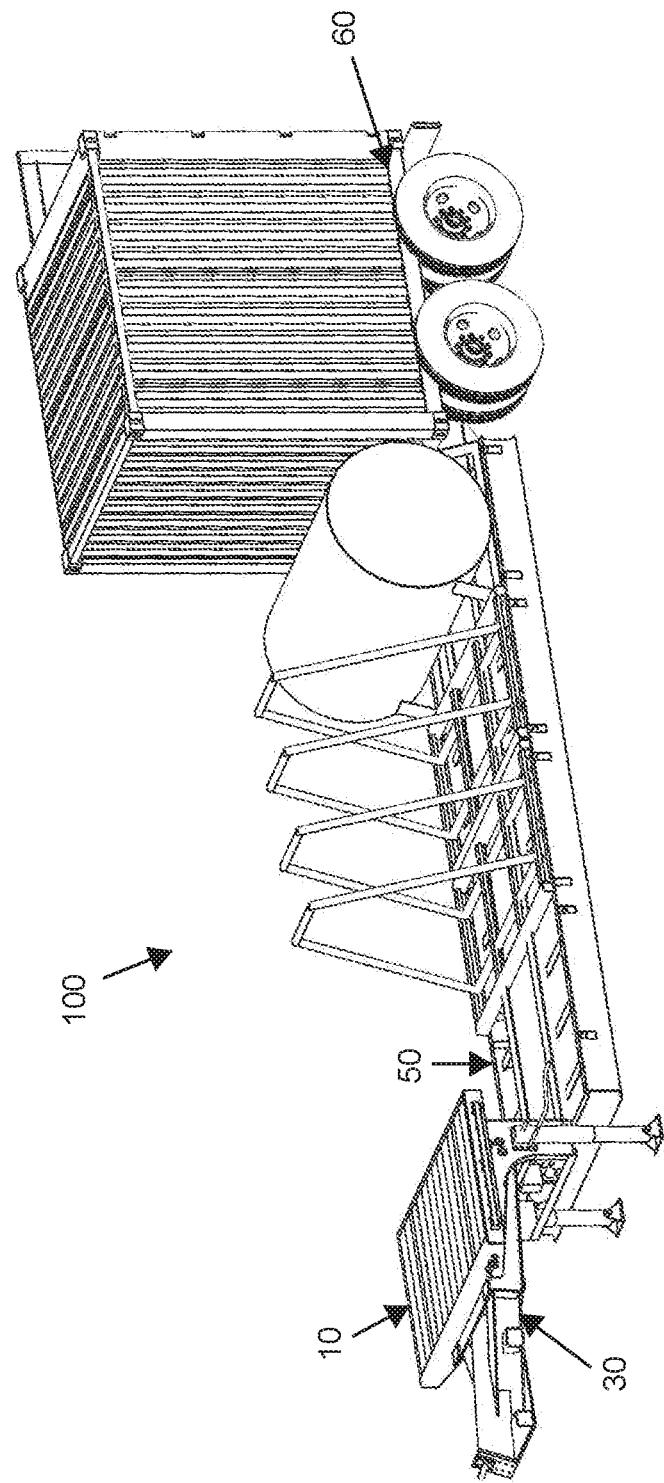
FIG. 4 illustrates a front top perspective view of an exemplary embodiment of the universal equipment trailer with optional second trailer and third trailer decks.

FIG. 4 illustrates a front top perspective view of an exemplary embodiment of universal equipment trailer 100 with optional second trailer deck 50 and optional third trailer deck 60. Third trailer deck 60 is located on the distal-most section of universal equipment trailer 100 opposite the first trailer deck 10.

Figure 5A:
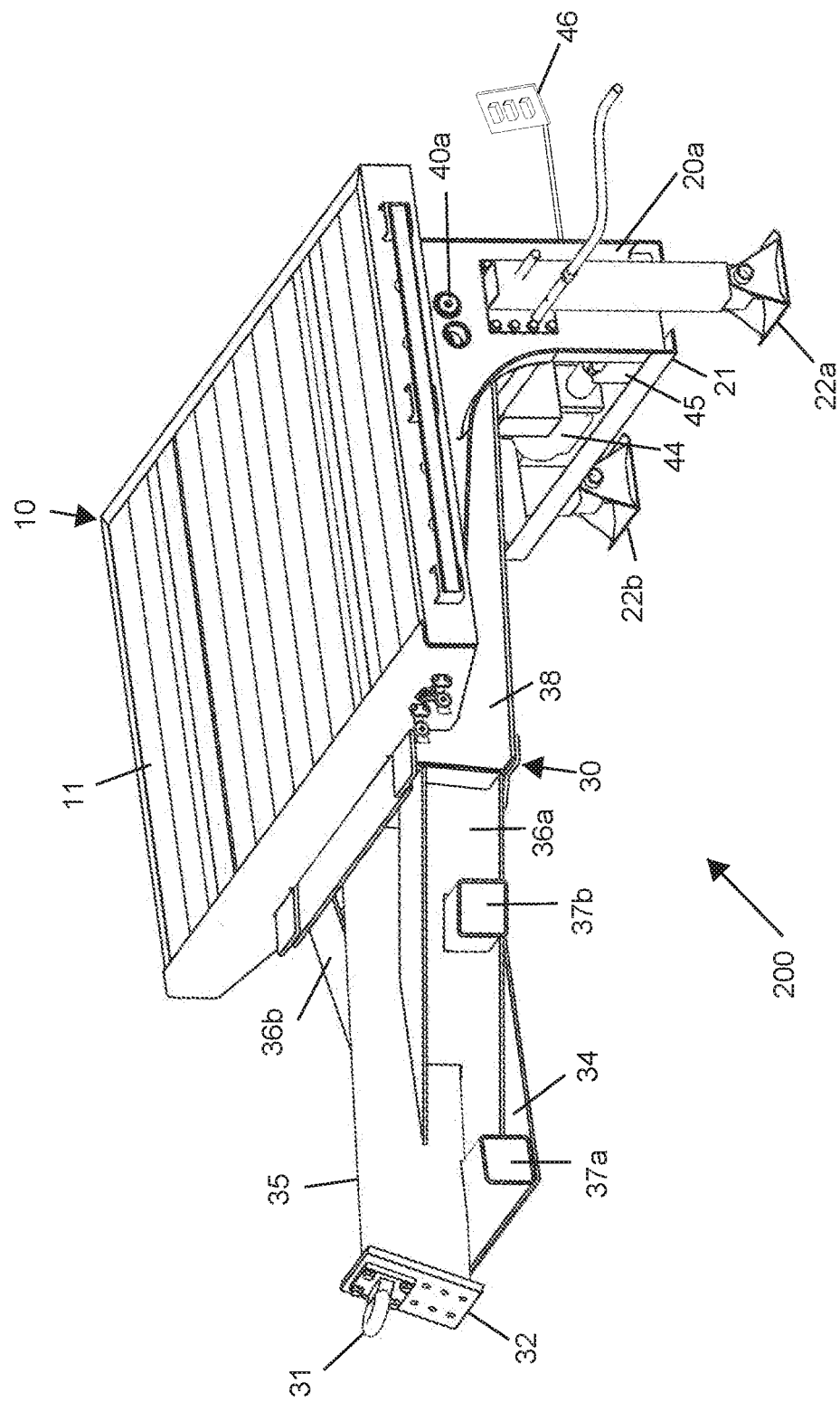
FIGS. 5a through 5c illustrate partial front top perspective and partial rear bottom perspective views of an exemplary embodiment of a kit and a front top perspective view of an exemplary embodiment of coupling box frame used in the kit, respectively.
Figure 5B:
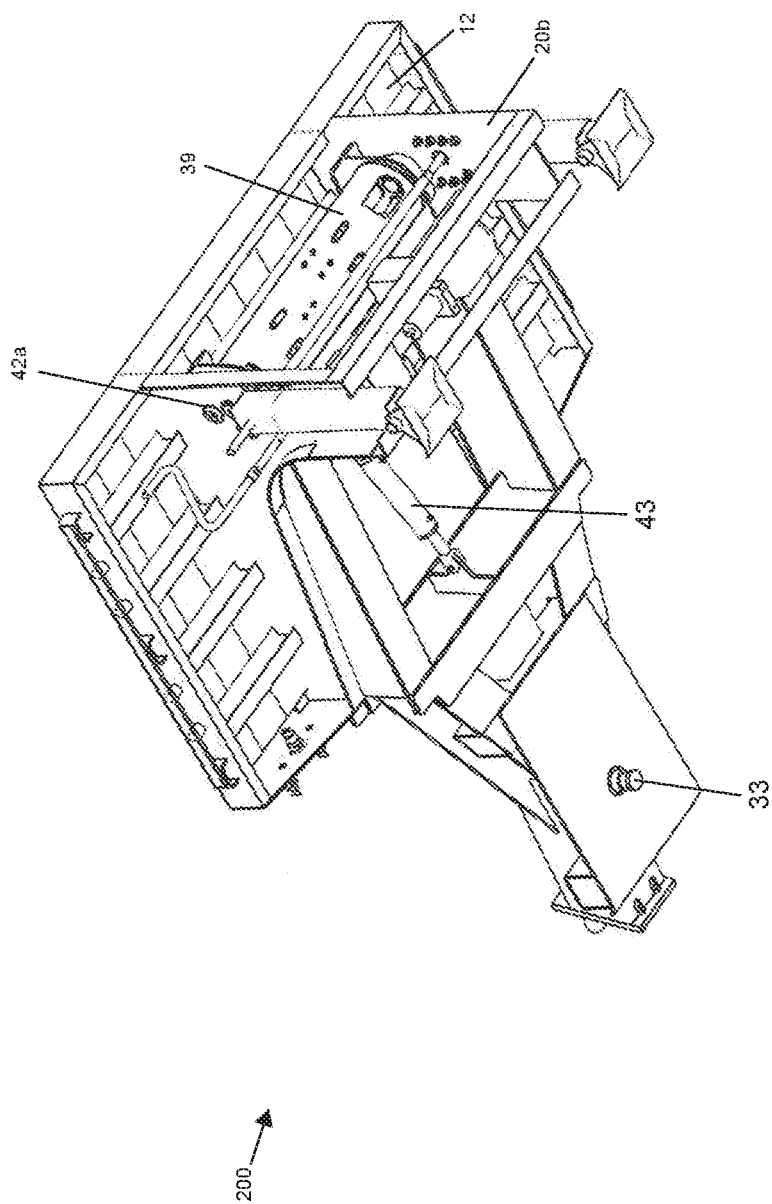
Figure 5C:
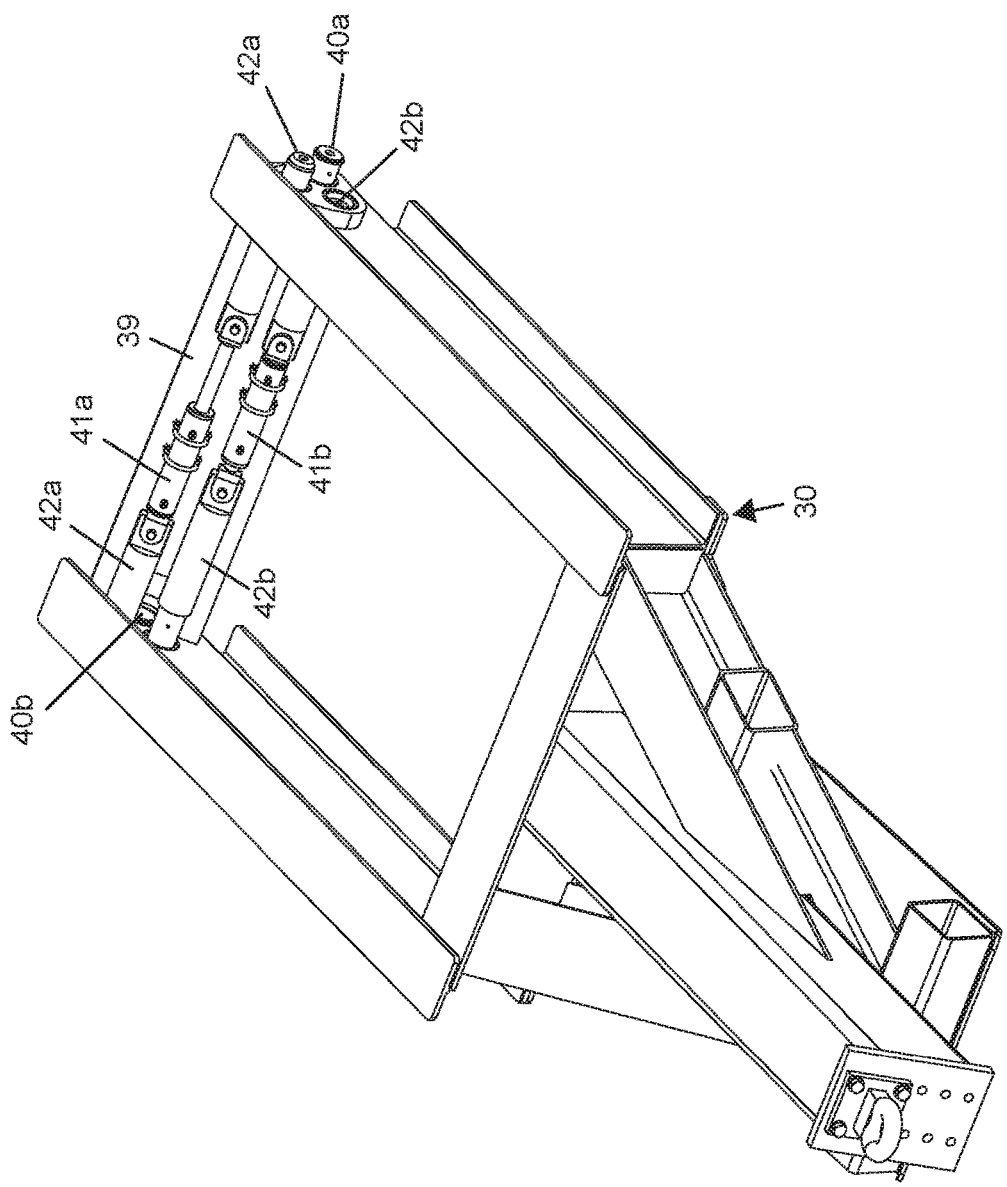

FIGS. 5a through 5c illustrate partial front top perspective and partial rear bottom perspective views of an exemplary embodiment of kit 200 and a front top perspective view of an exemplary embodiment of coupling box frame 30 used in kit 200, respectively.

In certain embodiments, components of universal equipment trailer 100 may be provided as a kit 200. Kit 200 may be used to convert trailers capable of connection to only a single type of hitch assembly. Such a kit 200 may include any or all of the following components in any embodiment, number, or combination: first trailer deck 10, trailer risers 20a and 20b, riser connector 21, adjustable landing gears 22a and 22b, coupling assembly 30, pintle ring connector 31, ring mounting plate 32, kingpin connector 33, kingpin mounting plate 34, central coupling beam 35, side coupling beams 36a and 36b, cross coupling beams 37a and 37b, coupling box frame 38, pin cylinder rest 39, rotational pins 40a and 40b, locking pin cylinders 41a and 41b, locking pin pairs 42a and 42b, rotational cylinder 43, fluid base unit 44, power source 45, and/or control unit 46. Such components may be preassembled into smaller sub-assemblies for easier conversion of the trailers.

Kit 200 may include or make available instructions for assembly of the above components and for conversion of the trailers. These instructions may be specific to particular models of trailers or provide a more general process.

While the above description of universal equipment trailer 100 refers to specific pintle ring and kingpin connectors, it should be appreciated that substitution of any other types of towing hitch connectors may be performed, so long as universal equipment trailer 100 remains capable of connecting to the towing vehicle. This may entail material modification to or substitution of elements of universal equipment trailer 100. By way of non-limiting example, a connector for a ball hitch on a pickup may need to be positioned at a different level than either a pintle ring or a kingpin. This may require modification of the size or position of various elements within universal equipment trailer 100.

As used herein, the term "proximal" refers to a location on universal equipment trailer 100 that is closer to the towing vehicle. As used herein, the term "distal" refers to a location on universal equipment trailer 100 that is further away from the towing vehicle.

Any version of any component or method step of the invention may be used with any other component or method step of the invention. The elements described herein can be used in any combination whether explicitly described or not.

As used herein, the singular forms "a," "an," and "the" include plural referents unless the content clearly dictates otherwise. Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such examples, process steps, and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A universal equipment trailer apparatus for connecting a trailer to a towing vehicle, the apparatus comprising:
   a first trailer deck rigidly connected to a first trailer riser and a second trailer riser;
   a coupling box frame rotatably connected to the first trailer riser and the second trailer riser by a plurality of rotational pins, wherein the coupling box frame is releasably connected to the first trailer riser and the second trailer riser by at least one of a plurality of locking pin pairs, wherein at least one side of the coupling box frame is a pin cylinder rest;
   a plurality of locking pin cylinders connected to the pin cylinder rest, wherein each locking pin cylinder interconnects one of the plurality of locking pin pairs;
   a rotational cylinder capable of raising and lowering the coupling box frame and a central coupling beam, wherein the rotational cylinder interconnects the coupling box frame and a lower surface of the first trailer deck; and
   the central coupling beam rigidly connected to the coupling box frame and extending between a pintle ring connector and a side of the coupling box frame opposite the pin cylinder rest, wherein a kingpin connector extends from a bottom surface of the central coupling beam.

2. The apparatus of claim 1, further comprising a plurality of side coupling beams interconnecting the coupling box frame and the central coupling beam, wherein the side coupling beams extend at an angle from the coupling box frame.

3. The apparatus of claim 1, further comprising a ring mounting plate interconnecting the central coupling beam and the pintle ring connector.

4. The apparatus of claim 1, further comprising a kingpin mounting plate interconnecting the central coupling beam and the kingpin connector.

5. The apparatus of claim 4, further comprising a plurality of cross coupling beams extending orthogonally to the central coupling beam and interconnecting the central coupling beam and the kingpin mounting plate.

6. The apparatus of claim 1, further comprising a fluid base unit connected to the plurality of locking pin cylinders and the rotational cylinder for pumping a fluid to or from the plurality of locking pin cylinders and the rotational cylinder.

7. The apparatus of claim 6, wherein the plurality of locking pin cylinders and the rotational cylinder are hydraulic cylinders and the fluid base unit includes a hydraulic reservoir.

8. The apparatus of claim 6, wherein the plurality of locking pin cylinders and the rotational cylinder are pneumatic cylinders and the fluid base unit is connected to the towing vehicle's air system.

9. The apparatus of claim 6, further comprising a power source connected to the fluid base unit and the towing vehicle's power system.

10. The apparatus of claim 1, further comprising a control unit connected to the plurality of locking pin cylinders and the rotational cylinder, wherein the control unit is configured to allow sequential actuation of one of the plurality of locking pin cylinders, the rotational cylinder, and the other of the plurality of locking pin cylinders.

11. The apparatus of claim 1, further comprising at least one riser connector rigidly interconnecting the first trailer riser and the second trailer riser.

12. The apparatus of claim 1, wherein the plurality of locking pin cylinders and the rotational cylinder are double-acting cylinders.

13. A kit for converting a trailer to a universal equipment trailer apparatus, the kit comprising:
   a first trailer deck rigidly connected to a first trailer riser and a second trailer riser;
   a coupling box frame rotatably connected to the first trailer riser and the second trailer riser by a plurality of rotational pins, wherein the coupling box frame is releasably connected to the first trailer riser and the second trailer riser by at least one of a plurality of locking pin pairs, wherein at least one side of the coupling box frame is a pin cylinder rest;
   a plurality of locking pin cylinders connected to the pin cylinder rest, wherein each locking pin cylinder interconnects one of the plurality of locking pin pairs;
   a rotational cylinder capable of raising and lowering the coupling box frame and a central coupling beam, wherein the rotational cylinder interconnects the coupling box frame and a lower surface of the first trailer deck; and
   the central coupling beam rigidly connected to the coupling box frame and extending between a pintle ring connector and a side of the coupling box frame opposite the pin cylinder rest, wherein a kingpin connector extends from a bottom surface of the central coupling beam.

14. The kit of claim 13, further comprising a plurality of side coupling beams interconnecting the coupling box frame and the central coupling beam, wherein the side coupling beams extend at an angle from the coupling box frame.

15. The kit of claim 13, further comprising a ring mounting plate interconnecting the central coupling beam and the pintle ring connector.

16. The kit of claim 13, further comprising a kingpin mounting plate interconnecting the central coupling beam and the kingpin connector.

17. The kit of claim 16, further comprising a plurality of cross coupling beams extending orthogonally to the central coupling beam and interconnecting the central coupling beam and the kingpin mounting plate.

18. The kit of claim 13, further comprising a fluid base unit for pumping a fluid to the plurality of locking pin cylinders and the rotational cylinder.

19. The kit of claim 18, wherein plurality of locking pin cylinders and the rotational cylinder are hydraulic cylinders and the fluid base unit includes a hydraulic reservoir.

20. The kit of claim 18, wherein the plurality of locking pin cylinders and the rotational cylinder are pneumatic cylinders.

21. The kit of claim 18, further comprising a power source connected to the fluid base unit and capable of connection to a towing vehicle's power system.

22. The kit of claim 13, further comprising a control unit connected to the plurality of locking pin cylinders and the rotational cylinder, wherein the control unit is configured to allow sequential actuation of one of the plurality of locking pin cylinders, the rotational cylinder, and the other of the plurality of locking pin cylinders.

* * * * *